US008397286B2

(12) United States Patent
Declety et al.

(10) Patent No.: US 8,397,286 B2
(45) Date of Patent: Mar. 12, 2013

(54) BIDIRECTIONAL GATEWAY WITH ENHANCED SECURITY LEVEL

(75) Inventors: Benjamin Declety, Paris (FR); Christian Haury, Cergy (FR)

(73) Assignee: Sagem Defense Securite, Paris (FR)

( * ) Notice: Subject to any disclaimer, the term of this patent is extended or adjusted under 35 U.S.C. 154(b) by 247 days.

(21) Appl. No.: 12/739,093

(22) PCT Filed: Oct. 21, 2008

(86) PCT No.: PCT/EP2008/064211
§ 371 (c)(1),
(2), (4) Date: Jul. 30, 2010

(87) PCT Pub. No.: WO2009/053361
PCT Pub. Date: Apr. 30, 2009

(65) Prior Publication Data
US 2010/0299742 A1    Nov. 25, 2010

(30) Foreign Application Priority Data
Oct. 23, 2007 (FR) ..................................... 07/07428

(51) Int. Cl.
*H04L 29/06* (2006.01)
(52) U.S. Cl. ............... 726/13; 726/12; 726/14; 713/166
(58) Field of Classification Search ............... 726/11, 726/12, 13, 14; 713/166
See application file for complete search history.

(56) References Cited

U.S. PATENT DOCUMENTS

| | | | | |
|---|---|---|---|---|
| 5,828,832 A * | 10/1998 | Holden et al. | | 726/12 |
| 6,351,817 B1 * | 2/2002 | Flyntz | | 726/4 |
| 6,389,542 B1 * | 5/2002 | Flyntz | | 726/17 |
| 6,643,698 B2 * | 11/2003 | Holden et al. | | 709/225 |
| 6,643,783 B2 * | 11/2003 | Flyntz | | 726/9 |
| 6,865,426 B1 * | 3/2005 | Schneck et al. | | 700/9 |
| 7,506,368 B1 * | 3/2009 | Kersey et al. | | 726/12 |
| 7,607,167 B1 * | 10/2009 | Johnson et al. | | 726/3 |
| 7,624,180 B2 * | 11/2009 | Holden et al. | | 709/225 |
| 7,675,867 B1 * | 3/2010 | Mraz et al. | | 370/254 |
| 7,873,071 B2 * | 1/2011 | Ung et al. | | 370/466 |
| 8,028,161 B2 * | 9/2011 | Kroselberg | | 713/152 |
| 8,041,946 B2 * | 10/2011 | Bunn et al. | | 713/166 |
| 8,060,744 B2 * | 11/2011 | O'Brien et al. | | 713/166 |
| 8,112,046 B2 * | 2/2012 | DeShazo | | 455/91 |
| 8,161,529 B1 * | 4/2012 | Bortz et al. | | 726/3 |
| 8,250,235 B2 * | 8/2012 | Harvey et al. | | 709/237 |
| 2002/0029280 A1 * | 3/2002 | Holden et al. | | 709/229 |
| 2002/0112181 A1 * | 8/2002 | Smith | | 713/201 |
| 2002/0147924 A1 * | 10/2002 | Flyntz | | 713/200 |

(Continued)

FOREIGN PATENT DOCUMENTS
WO    WO 2005/114947 A1    12/2005

*Primary Examiner* — David García Cervetti
(74) *Attorney, Agent, or Firm* — Gerald E. Helget; Nelson R. Capes; Briggs and Morgan, P.A.

(57) ABSTRACT

A bidirectional gateway with enhanced security level between a high-security communication network and a low-security communication network. The return pathway from the low-security network to the high-security network comprises a low-speed link. The physical layer of the low-speed link differs from the physical layers involved in the high-security network and the low-security network. The low-speed link having a linking layer according to a protocol differing from the protocols used on the linking layers used on the high-security network and the low-security network. The linking layer of the low-speed link has an authentication protocol to guarantee the data's origin.

14 Claims, 2 Drawing Sheets

U.S. PATENT DOCUMENTS

| | | | |
|---|---|---|---|
| 2002/0162024 A1* | 10/2002 | Cunchon et al. | 713/201 |
| 2004/0083286 A1* | 4/2004 | Holden et al. | 709/225 |
| 2005/0021595 A1* | 1/2005 | Wesinger et al. | 709/200 |
| 2005/0033990 A1* | 2/2005 | Harvey et al. | 713/201 |
| 2006/0143449 A1* | 6/2006 | Groger et al. | 713/166 |
| 2007/0076599 A1* | 4/2007 | Ayyagari et al. | 370/229 |
| 2007/0204145 A1* | 8/2007 | Bunn et al. | 713/152 |
| 2007/0263658 A1* | 11/2007 | Ung et al. | 370/466 |
| 2009/0193503 A1* | 7/2009 | Shevehenko et al. | 726/4 |
| 2009/0252070 A1* | 10/2009 | Connors et al. | 370/311 |
| 2010/0005179 A1* | 1/2010 | Dickson et al. | 709/228 |
| 2010/0064352 A1* | 3/2010 | Holden et al. | 726/4 |
| 2010/0197246 A1* | 8/2010 | DeShazo | 455/91 |
| 2010/0299742 A1* | 11/2010 | Declety et al. | 726/13 |
| 2011/0145451 A1* | 6/2011 | Soffer et al. | 710/64 |
| 2011/0153969 A1* | 6/2011 | Petrick | 711/163 |
| 2012/0017079 A1* | 1/2012 | Mraz et al. | 713/153 |
| 2012/0030768 A1* | 2/2012 | Mraz et al. | 726/26 |

\* cited by examiner

BIDIRECTIONAL GATEWAY WITH ENHANCED SECURITY LEVEL

CROSS REFERENCE TO RELATED APPLICATIONS

The present application is based on and claims priority to International Application PCT/EP2008/064211 filed on Oct. 21, 2008 and French patent application Ser. No. 07/07428 filed on Oct. 23, 2007, the contents of which are hereby incorporated by reference in their entirety.

BACKGROUND OF THE INVENTION

The present invention concerns a secure gateway affording bidirectional communication between two communication networks; a first high-security network and a second network with lower security.

FIG. 1 illustrates the general architecture of the system in which the invention is situated. The gateway referenced 1.1 connects a first network referenced 1.2 to a second network referenced 1.3. In the context of the invention, the two networks do not have the same security level. The term network is employed here to designate the communication network proper as well as the set of connected items of equipment that can communicate with one another. Security level means all the operating rules and constraints imposed on the network in order to ensure that only the expected data streams can pass over this network; that these streams pass between the expected items of equipment and that they are not liable to be captured by unauthorized equipment. When networks having different security levels communicate with each other, it is necessary to ensure that the high-security network cannot be corrupted by attacks coming from the low-security network. In some contexts requiring a high security level, this guarantee must be very strong, or even absolute. One example of such a context concerns avionics, where the data network connecting the control equipment of the aircraft must absolutely offer a very high security level especially during flight. It is however advantageous to connect this high-security network to a lower-security network in order, among other things, to recover data on the various parameters of the flight during maintenance. It is also advantageous to be able on a passenger network to provide real-time information on the flight during the latter.

Constructing monodirectional gateways between two networks having different security levels is known. In this case, the gateway allows the transfers of data from the high-security network to the low-security network. The monodirectional side can even be guaranteed at the physical level of the communication, for example by using the diode described in the patent application of the same applicant published under the publication number FR 2 862 399. This type of gateway guarantees that it will be impossible for an attack coming from the low-security network to compromise the high-security network.

To allow the functioning of certain applications, it is however necessary to transmit information coming from the low-security network to the high-security network. It may sometimes be a case of simple commands.

It is also advantageous to be able to have available flow control mechanisms during data transfers from the high-security level to the low-security level. Flow control requires being able to send back information to the source of the transfer and therefore from the low-security network to the high-security network. However, it is desirable for the security level to be maintained at a very high level. It is therefore necessary to guarantee control over the information going back from the low-security network to the high-security network. This control guarantees security of a very high level.

It is conventional to produce gateways by means of a firewall in this type of situation. These firewalls organize a filtering of the data circulating over the gateway. These filterings are done according to the communication protocols used and the port addresses and numbers involved in the communication. However, the security level afforded by such a firewall is not sufficient in some contexts where the need for security is particularly high. It is advantageous to be able to raise the security level of such a gateway in order to be able to guarantee a security level close to the security level afforded by a monodirectional gateway.

BRIEF SUMMARY OF THE INVENTION

The present invention proposes a bidirectional gateway with enhanced security level between a high-security communication network and a low-security communication network. For this purpose, the return pathway from the low-security network to the high-security network comprises a low-speed link. The physical layer of this low-speed link differs from the physical layers involved both in the high-security network and in the low-security network. This low-speed link is provided with a linking layer according to a protocol that differs from the protocols used on the linking layers used both on the high-security network and on the low-security network. Advantageously, the linking layer of the low-speed link is provided with an authentication protocol guaranteeing the origin of the data.

The gateway according to the invention offers a high level of security by virtue of simple mechanisms easy to certify. It can therefore be used in applications having high security constraints that have to be guaranteed by the solution provider.

The invention concerns a device (2.1) for interconnecting at least two data communication networks, connecting a first network referred to as the high-security network and at least one second network referred to as the low-security network, comprising a first communication interface (2.11) with the high-security network; a second communication interface (2.12) with the low-security network; a routing module (2.3) connected to the first interface; an adaptation module (2.8) connected to the second interface; a monodirectional pathway (2.4, 2.6), referred to as the downlink pathway, between the routing module (2.3) and the adaptation module (2.8), for transferring data from the routing module (2.3) to the adaptation module (2.8), and a monodirectional pathway (2.5, 2.7, 2.8), referred to as the return pathway, between the adaptation module (2.8) and the routing module (2.3), for transferring data from the adaptation module (2.8) to the routing module (2.3), all the data transfers between the first interface (2.11) and the second (2.12) necessarily passing through these two monodirectional pathways.

According to a particular embodiment of the invention, the device also comprises a means (2.6) of guaranteeing at the physical level the monodirectional side of the downlink pathway.

According to a particular embodiment of the invention, the device also comprises a means (2.10) of reducing the speed of at least a portion of the return pathway with respect to the speed of the interfaces of the device, thus forming a link referred to as the low-speed link.

According to a particular embodiment of the invention, the low-speed link (2.10) is a series link.

According to a particular embodiment of the invention, the device comprises a firewall (2.7) on the return pathway filtering data passing over the return pathway.

According to a particular embodiment of the invention, the device also comprises means (2.8) of formatting the data transmitted over the return pathway, upstream of the low-speed link, according to a communication protocol different from the communication protocols used for communication on the interfaces of the device, and means (2.5) of reconstituting the data transmitted over the return pathway, downstream of the low-speed link, from the data formatted according to the said communication protocol different from the communication protocols used for communication on the interfaces of the device.

According to a particular embodiment of the invention, said communication protocol different from the communication protocols used for communication on the interfaces of the device using data packets comprising a label (3.1) identifying the type of data, the firewall comprises means of filtering the packets according to a list of authorized labels.

According to a particular embodiment of the invention, a maximum transmission rate being defined for each label, the firewall (2.7) comprises means of verifying the transmission rate for the packets of each label and rejecting the packets of a given label should this rate be exceeded.

According to a particular embodiment of the invention, several operating modes being defined for the device, the list of authorised labels depends on the operating mode of the device.

According to a particular embodiment of the invention, all the data transmitted over the return pathway being signed cryptographically by an asymmetric-key mechanism, the device also comprises cryptography means (2.5) for verifying the identity of the data source.

According to a particular embodiment of the invention, all the data transmitted over the return channel being enciphered cryptographically by an asymmetric-key mechanism, the device also comprises cryptography means (2.5) for deciphering the data transmitted.

The invention also concerns a flow control method for data transmission in packets within a device according to one of claim 10 or 11, comprising, for each data packet, a step of transmission of the data packet by the routing module, comprising:

a step of preparing a signed packet called the Ok packet;

a step of preparing a signed packet referred to as the Ko packet;

a step of conjoint transmission of the data packet and the Ok and Ko packets on the downlink pathway;

and a step of reception by the adaptation module comprising:

a step of testing the correct transmission of the data packet;

if the transmission has occurred correctly, a step of transmitting the Ok packet on the return pathway;

if the transmission has occurred wrongly, a step of transmitting the Ko packet on the return pathway.

According to a particular embodiment of the invention, the method also comprises a step of periodic transmission of a signed packet referred to as NOP on the downlink pathway by the routing module in the event of non-reception on the return pathway during a given time and a step of transmission on the return pathway of any NOP packet received on the downlink pathway by the adaptation module.

BRIEF DESCRIPTION OF THE DRAWINGS

The features of the invention mentioned above, as well as others, will emerge more clearly from a reading of the following description of an example embodiment, said description being given in relation to the accompanying drawings, among which.

DETAILED DESCRIPTION OF THE INVENTION

Figure 1:
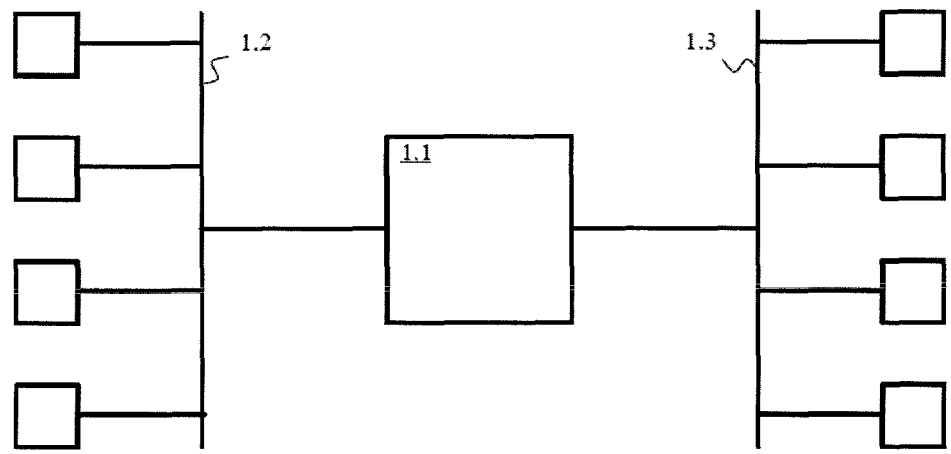
FIG. 1 illustrates the general architecture of the system in which the present invention is situated.
Figure 2:
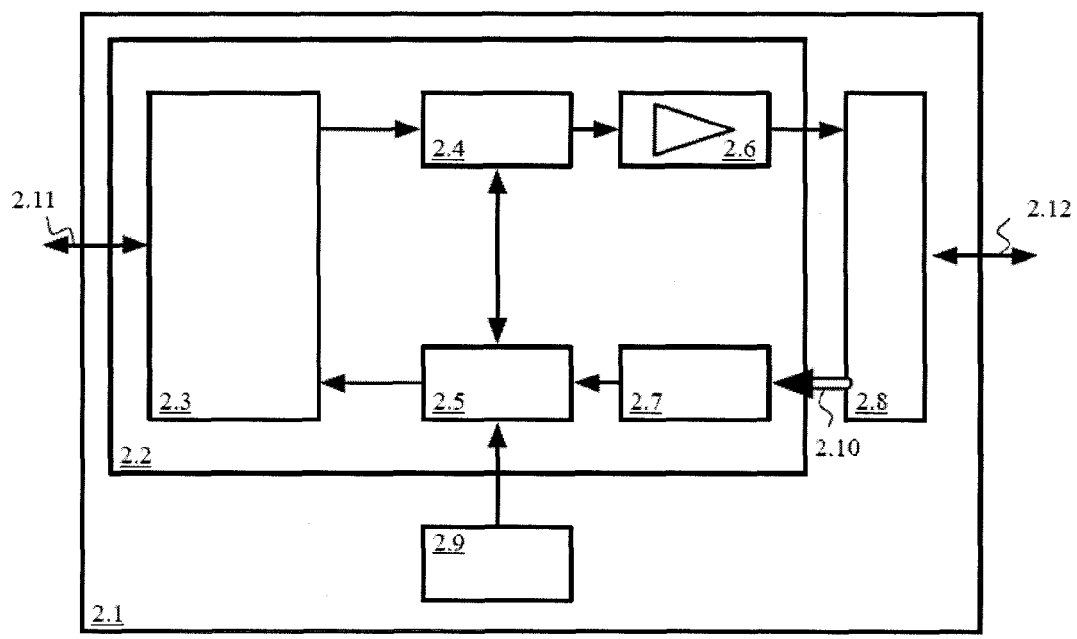
FIG. 2 illustrates the architecture of an example embodiment of the invention.

The architecture of the gateway, according to the example embodiment, is illustrated in FIG. 2. The gateway 2.1 contains a so-called confidence zone referenced 2.2. This confidence zone offers the security level of the high-security network connected to the communication interface 2.11. As for the low-security network, this is connected to the communication interface 2.12. The external communication interfaces of the gateway, 2.11 and 2.12, are standard interfaces such as for example Ethernet interfaces according to the standard 802.3 of the IEEE (Institute of Electrical and Electronics Engineers). These interfaces afford communication according to the IP protocol (Internet Protocol, defined by RFC 791). This gateway comprises in the confidence zone a routing module, referenced 2.3, responsible for managing the link with the high-security network. This routing module is connected to two monodirectional pathways: a so-called downlink pathway taken by the data traffic coming from the high-security network and going to the low-security network, and a so-called return pathway taken by the data traffic coming from the low-security network going to the high-security network. An adaptation module referenced 2.8 makes the link between the low-security network 2.12 and the two monodirectional channels. All the data traffic between the high-security network and the low-security network necessarily passes through these two monodirectional channels. There does not exist any other pathway that can be taken by the data passing through the gateway.

The downlink pathway comprises a pathway management module referenced 2.4 and called DMZ-out. The data passing over this downlink pathway preferentially pass through a diode referenced 2.6 that guarantees at the physical level that there will not be the slightest transfer of data going back over the downlink pathway. By virtue of this diode, the security of the downlink pathway is total.

The return pathway comprises a particular communication link referenced 2.10 referred to as the low-speed link. This low-speed link 2.10 affords communication between the adaptation module 2.8 and a firewall referenced 2.7, responsible for filtering the data passing over the low-speed link 2.10. These data, once filtered by the firewall 2.7, are then managed by a second pathway management module referenced 2.5 and called DMZ-in before being transmitted to the routing module 2.3 for transmission to the high-security network. A media reader 2.9 can if necessary be connected to the pathway management module DMZ-in.

One aspect of the security of the gateway comes from the physical separation of the downlink communication and the returning communication. This separation of the communication into two monodirectional pathways affords specific control of the communications on the two pathways. This is because the downlink data coming from the high-security network do not require thorough control since they are assumed to be secure, while the returning data are suspect data requiring thorough control in order to limit the risk of corruption of the high-security network.

We have seen that the downlink pathway is advantageously protected at the physical level by a diode preventing any return of information. In this advantageous case, the security level of the gateway and therefore of the high-security network will depend on the level of control over the information taking the return pathway. It is therefore all the control mechanisms used for controlling this return pathway that will define the services that can be used through the gateway and their security level. The mechanisms for managing the low-speed link 2.10 and the firewall 2.7 are advantageously implemented on the same programmable logic circuit.

One aspect of the control of the return link relates to the nature of the so-called low-speed link 2.10 between the adaptation module 2.8 and the firewall 2.7. This link is referred to as low speed since it is constructed so as to guarantee a low data transfer speed. This is because a low speed, typically around a few kilobytes per second, makes any so-called brute force attack, involving a large number of attempts and therefore requests passing through the gateway, improbable. A series link is preferentially used for implementing the low-speed link 2.10, but it will also be possible to use an ARINC 429, a CAN bus or a discrete link. This series link guarantees physically and therefore in foolproof manner a reduced speed on the return pathway compared with the rate used on both the high-security and low-security networks, which function typically on physical Ethernet links with a speed of around ten or even a hundred megabytes per second. There is therefore a reduction in the speed by a factor that may be between 1000 and 10000 between the maximum speed of the low-speed link and the speed of the gateway interfaces. This aspect of the control of the return pathway therefore relates to the use of physical means of reducing the maximum speed of this return pathway.

The security level of this low-speed link is advantageously supplemented by a communication protocol brake mechanism. To do this, a particular protocol is used on the low-speed link. This protocol is managed by the adaptation module 2.8 upstream of the link and by the DMX-in pathway management module 2.5 downstream. The adaptation module 2.8 formats the data transmitted according to this protocol while the DMZ-in pathway management module reconstitutes the data transmitted from the data formatted according to the protocol. The firewall merely filters the data transmitted according to this protocol and therefore guarantees that any data passing through the return pathway is in accordance with this protocol. It is therefore not possible to transmit data by the uplink pathway according to a conventional protocol such as IP (Internet Protocol defined by RFC 791), UDP (User Datagram Protocol defined by RFC 768) or TCP (Transmission Control Protocol defined by RFC 793). Because of this protocol break, an attack is make more difficult. This is because the protocol used on the low-speed link is a protocol that is undocumented and not accessible from outside the gateway since it connects two internal components of the latter.

Figure 3:
FIG. 3 illustrates the form of a data packet passing over the low-speed link in the example embodiment of the invention.

In the example embodiment of the invention, this protocol uses a packet transmission the structure of which is illustrated in FIG. 3.

These packets comprise a first field 3.1 containing a label for describing the type of data transported. One label value corresponds to commands sent, another to data, another possibly to the flow control mechanism that will be described below. Other types can be used. The packet also comprises a field 3.2 that contains the transported data. The field 3.3 of the packet comprises a checksum, for example a CRC (Cyclic Redundancy Check) for checking on the integrity of the data transported. The packets are prepared by the adaptation module 2.8, which performs in particular a conversion for the physical link, mention of the label and calculation of the CRC. The data transported were prepared by the source, which then signed them by means of an authentication mechanism. These data consist of a useful data/descriptor pair. The descriptor contains the information that will be necessary for reconstituting the data downstream of the link. This is protocol information for executing the command when the data correspond to a command or storage instruction when it is a case of data. The data are signed as from the source so that the verifying entity can verify the origin thereof and use them with confidence. The data transported over the low-speed link therefore correspond to the useful data and to the associated descriptor, the whole being signed and optionally enciphered.

Figure 4:
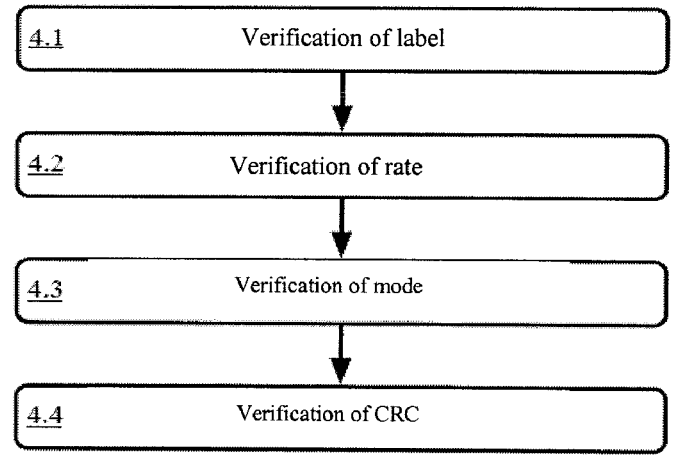
FIG. 4 illustrates the functioning of the firewall of the example embodiment of the invention.

The firewall is intended to ensure that only packets according to this transfer protocol pass through the low-speed link. The main actions performed by this firewall are described in FIG. 4. During a step 4.1, the firewall checks that the packet label is a label that is authorized and known. For example, it is checked that the label forms part of a list of authorized labels. During a possible step 4.2, the rate of sending of the packets corresponding to this label is checked. In this eventuality, maximum transmission rates are defined for each type of data and therefore each label. If the packet reception rate of a given label exceeds a fixed threshold, the packets are rejected. This check ensures that there are no massive sendings of packets of a given label. It is an additional protection against corruption of the adaptation module directly connected to the low-security network. During a step 4.3, the firewall checks the operating mode. This step is performed in the case where several operating modes are defined. Certain types of data and therefore certain labels may be prohibited in certain operating modes. Typically, in the case of use in avionics, a ground mode and a flight mode are defined. Certain types of data will be authorized only when the aircraft is on the ground and therefore the gateway in ground mode. These same labels will be prohibited in flight mode. The list of labels authorized can therefore depend on the operating mode of the gateway. Finally, during a step 4.4, the firewall checks the integrity of the packet by a check on the checksum, typically a CRC.

After passage through the firewall, the packets are transmitted to the DMZ-in pathway management module. This DMZ-in module is responsible for the interpretation of the packets, the reconstruction thereof according to the label and the checking of the authentication mechanism. As indicated above, the transported data are signed by means of a set of asymmetric keys. They contain a signature that the DMZ-in module can check by means of the required public keys and certificates that it contains. To increase the security level, it is required that any data transmitted by the uplink channel be signed by an asymmetric-key authentication mechanism. It is thus ensured that only the participants expected and duly authenticated can send data to the high-security network. Preferentially, the data are also enciphered by means of the same certificates. The DMZ-in module therefore ensures that the signatures are verified and thus checks the identity of the source of the data. When the data sent have had to be parcelled into several packets for transmission over the low-speed link by the adaptation module, the DMZ-inmodule reconstitutes the parcelled data. Once they have been reconstituted and their integrity and the source have been verified by processing of the digital signature, the data can be delivered to their destination for processing. Where the data are enciphered, the destination transmits the data to the DMZ-out module for deciphering. This is because, in the embodiment described, the enciphering and deciphering are carried out by cryptographic means of the DMZ-out module, for example of the SIM card (Subscriber Identity Module) type. These means include a private key enabling the DMZ-out module to encipher the data that it receives before transmitting them to the diode or deciphering the data supplied by the enciphered uplink-stream destinations.

This gateway makes it possible to implement simple mechanisms requiring interaction between the two networks. It is thus possible to send data to the high-security network. It is also possible to send commands for triggering the sending of data in the opposite direction.

It becomes possible for a client on the low-security network to trigger the sending of data and to choose the data that he wishes to receive from the high-security network. These mechanisms are implemented in a controlled manner by participants duly authenticated through a limited number of mechanisms. All the data going back follow a channel limited in speed and pass using a non-standard protocol. All the data packets according to this non-standard protocol are filtered by a dedicated firewall implementing filtering rules adapted to the protocol according to constraints relating to the various types of data. These restraints can comprise the transmission rate, that is to say the speed of the data for a particular type, and the operating mode of the gateway.

Figure 5:
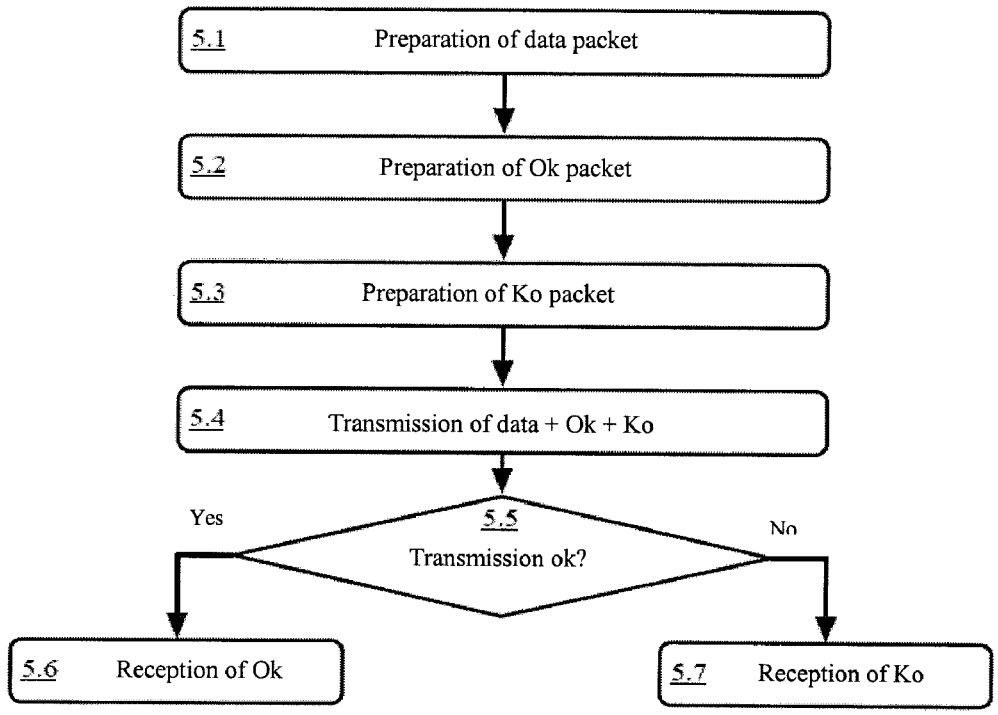
FIG. 5 illustrates the functioning of the acknowledgement mechanism in the example embodiment of the invention.

In particular, it is possible to implement flow control for the data passing from the high-security network to the low-security network. This mechanism is illustrated by FIG. 5. For this purpose, the DMZ-out pathway management module prepares, for each data packet sent, two packets able to be returned to it by the adaptation module. These are steps 5.2, 5.2 and 5.3. A first packet is referred to as the Ok packet and will mean that the data packet is properly received by the adaptation module. A second packet is referred to as the Ko packet and will mean that the packet has not been correctly received by the adaptation module. It has been seen that any packet had to be duly signed in order to be accepted by the return pathway of the gateway. Consequently the Ok and Ko packets will be signed by their sender on the high-security network side. This sender may be the DMZ-out module. During step 5.4, the data packet is transmitted jointly with the two packets Ok and Ko. When the data packet is received by the adaptation module, it returns, steps 5.6 and 5.7, via the return pathway, the Ok and Ko packet according to a test 5.5 on the data packet transmission. Because these packets are duly signed by the DMZ-out module, they pass without any problem the checks made on the return pathway without being able to be corrupted. On reception of a Ko packet, the DMZ-out retransmits the wrongly received packet. On reception of an Ok packet, the DMZ-out continues transmission with the following packet. This mechanism can also apply to flow control by transmission window, where the size of the transmission window adapts according to the type of packet Ok or Ko received.

When no response has been received for a certain time, the DMZ-out generates a packet referred to as the NOP packet. This packet corresponds to an Ok packet not associated with a data packet. This packet is transmitted via the downlink pathway in order to be returned by the adaptation module. In the event of non-reception of the packet in return the line can be considered to be broken. The NOP packet continues to be transmitted regularly in order to make it possible to detect a return to normal. As long as this NOP packet is not received in return, no data packet is transmitted. These Ok, Ko and NOP packets are interpreted and checked by the DMZ-in before being transmitted in return to the DMZ-out.

Advantageously, an anti-replay mechanism is implemented in these Ok, Ko and NOP packets. This mechanism can be implemented in the form of a sequence number or timestamp in the packet. This anti-replay mechanism avoids any attack by malevolent return of these packets.

The flow control mechanism is not necessarily applied to all the downlink data transfers. In particular, the transfers of small quantities of data can be done according to a so-called send and forget mode. In this mode, the DMZ-out sends the data packet without generating Ok or Ko packets. These packets are not stored and correct transmission thereof is not verified.

The invention claimed is:

1. A bidirectional gateway with enhanced security level (2.1) for interconnecting a first network having a first security level and at least one second network having a second security level that is lower than the security level of the first network, said device (2,1) comprising:
   a. a first interface (2,11) intended to receive data from and transmit data toward said first network and a second interface (2,12) intended to receive data from and transmit data toward said second network,
   b. a routing module (2,3) connected to the first interface (2,11), to a first monodirectional pathway (2,4; 2,6), referred to as the downlink pathway, and to a second monodirectional pathway (2,5; 2,7), referred to as the returnlink pathway, and provided to route, in one hand, all data on the first interface (2,11) to the first monodirectional pathway (2,4; 2,6) and, in other hand, data from the second monodirectional pathway (2,5; 2,7) to the first interface (2,11),
   c. an adaptation module (2,8) connected to the second interface (2,12), to said first monodirectional pathway (2,4; 2,6) and to said second monodirectional pathway (2,5; 2,7) and provided to route, in one hand, all data on the second interface (2,12) to the second monodirectional pathway (2,4; 2,6) and, in other hand, data from the first monodirectional pathway (2,5; 2,7) to the second interface (2,11), said first monodirectional pathway (2,4; 2,6) including means for performing a first processing and, said second monodirectional pathway (2,5; 2,7) including means for performing a second processing different from the first processing.

2. The gateway of claim 1, wherein said first monodirectional pathway includes means (2.6) for guaranteeing, at the physical level, the monodirectional feature of the downlink pathway.

3. The gateway of claim 1, wherein said second monodirectional pathway includes means (2.10) for reducing the data rate so that the data rate on at least a portion of the return pathway is reduced compared with the data rate on said second interfaces (2,12), thus forming a link referred to as a low data rate link.

4. The gateway of claim 3, wherein said low data rate link is a series link.

5. The gateway of claim 1, wherein said second monodirectional pathway includes a firewall (2.7) for filtering the data passing over the return pathway.

6. The gateway of claim 1, wherein said adaptation module (2.8) includes means for formatting the data routed to the second monodirectional pathway so that the communication protocol of said formatted data is different from the communication protocols used on the second interface (2,12) and said second monodirectional pathway includes means (2.5) for reconstituting the original data from the formatted data.

7. The gateway of claim 6, wherein said means for formatting the data transmitted to the return pathway are upstream of the low data rate link and said means (2.5) for reconstituting the original data are downstream of the low data rate link.

8. The gateway of the claim 6, wherein said communication protocol different from the communication protocols used for communication on the second interface (2,12) is a data packets transport protocol, each data packet comprising a label (3.1) identifying the type of data transported, said second monodirectional pathway including a firewall (2,7) intended to filter said packets according to a list of authorised labels.

9. The gateway of claim 8, wherein said communication protocol provides a maximum transmission rate for each label, and said firewall (2.7) comprises means for measuring the effective transmission rate of each packet and for rejecting a packet in case its effective transmission rate exceeds the maximum transmission rate corresponding to its label.

10. The gateway of claim 9, wherein the list of authorised labels depends on the operating mode of the device among several operating modes.

11. The gateway of claim 1, wherein all the data transmitted over the return pathway are cryptographically enciphered by an asymmetric-key mechanism, and the second monodirectional pathway includes cryptography means (2.5) for deciphering the data transmitted.

12. The gateway of claim 1, wherein all the data transmitted over the return pathway are cryptographically signed by an asymmetric-key mechanism and the second monodirectional pathway includes cryptography means (2.5) for verifying the identity of the data source.

13. The gateway of claim 12, wherein the data transmission over the first and second monodirectional pathways are packet transmission, wherein said first monodirectional pathway includes path control means (2,4),
  a. said path control means (2,4) being intended to prepare, for each packet to be transmitted from the first network to the second network a signed packet referred to as Ok packet and a signed packet referred to as the Ko packet, and to conjointly transmit said data packet along with both Ok and Ko packets;
  b. said adaptation module (2,8) further being intended to test over the first monodirectional pathway and, if the transmission has judged to be correct, to transmit said Ok packet on the return pathway, whereas, if the transmission has judged to be incorrect, to transmit the Ko packet on the return pathway.

14. The gateway of claim 13, wherein said first path control means (2,4) are intended to periodically transmit over the downlink pathway a signed packet referred to as a NOP packet in the event of non-reception on the return pathway of neither an Ok packet or a Ko packet during a given time and said adaptation module is intended to transmit on the return pathway any NOP packet received from the downlink pathway.

\* \* \* \* \*